No. 818,331. PATENTED APR. 17, 1906.
E. E. ANDREWS.
FRICTION CLUTCH.
APPLICATION FILED APR. 24, 1905.
2 SHEETS—SHEET 1.
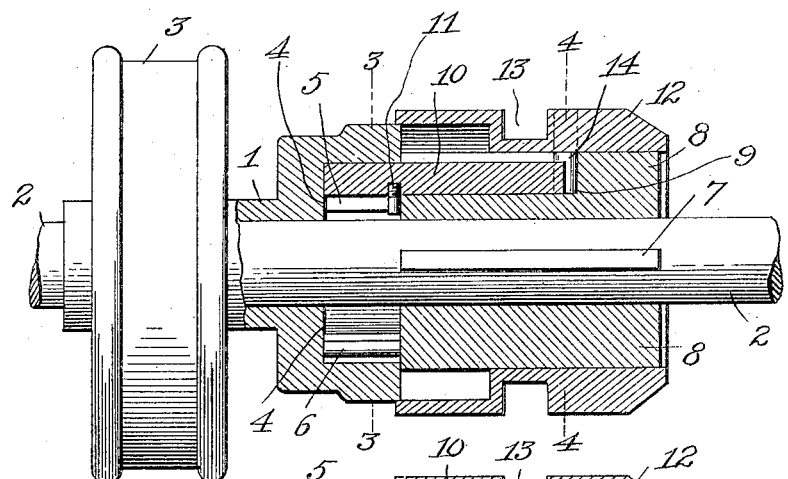
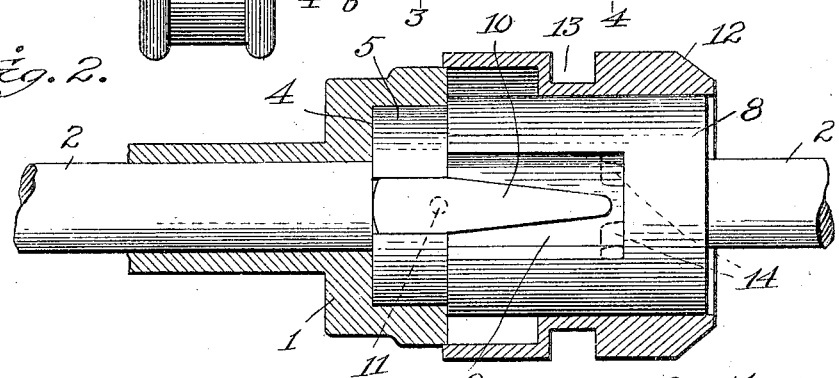
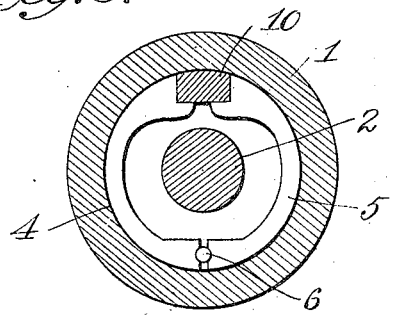
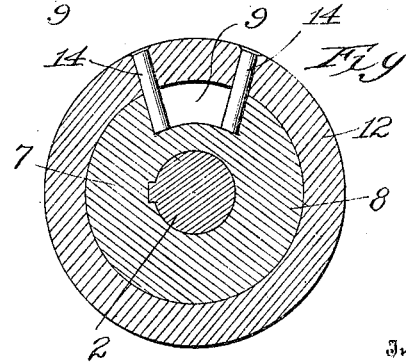
Witnesses
Edwin L. Jewell
W. C. Isel
Inventor
Edwin E. Andrews
by Percy B. Hills
Attorney

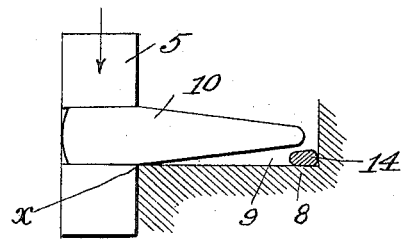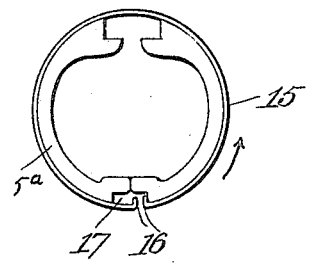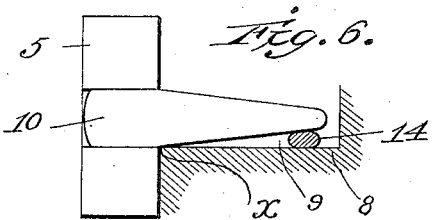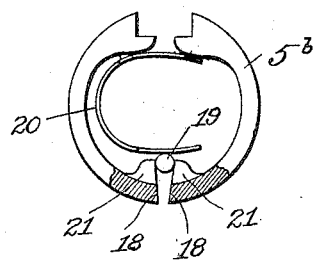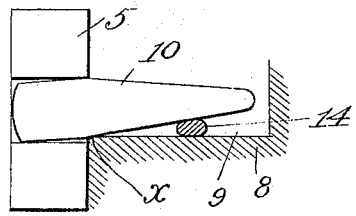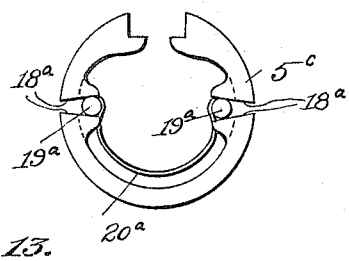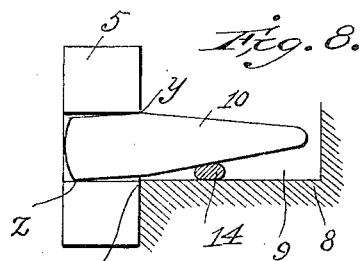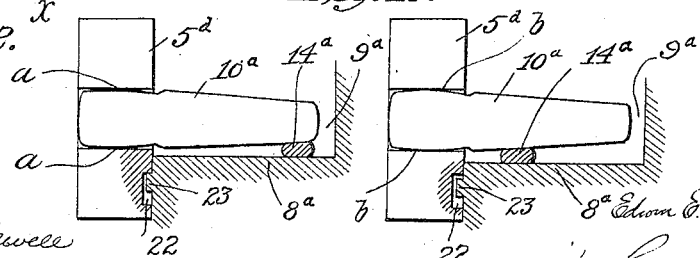

UNITED STATES PATENT OFFICE.

EDWIN EADS ANDREWS, OF AKRON, OHIO, ASSIGNOR TO AUTOMATIC CLUTCH COMPANY, OF AKRON, OHIO, A CORPORATION OF OHIO.

FRICTION-CLUTCH.

No. 818,331.     Specification of Letters Patent.     Patented April 17, 1906.

Application filed April 24, 1905. Serial No. 257,225.

*To all whom it may concern:*

Be it known that I, EDWIN EADS ANDREWS, a citizen of the United States, residing at Akron, in the county of Summit and State of Ohio, have invented new and useful Improvements in Friction-Clutches, of which the following is a specification.

My invention relates to friction-clutches, and more particularly to that type in which an expansible member, such as a split ring, is employed as the means of connection between the two members of the clutch, and has for its object to provide an improved construction embodying simplicity in construction and certainty in operation, as will be hereinafter more definitely pointed out and claimed, reference being had to the accompanying drawings, in which—

Figure 1 is a vertical longitudinal sectional view of the clutch. Fig. 2 is a longitudinal section taken at a right angle to Fig. 1, the wedge or lever, split ring, and driven member being shown in full lines. Fig. 3 is a transverse sectional view taken on the line 3 3, Fig. 2. Fig. 4 is a view similar to Fig. 3, taken on the line 4 4, Fig. 1. Figs. 5, 6, 7, and 8 are diagrammatic views illustrating the operation of the device. Figs. 9, 10, and 11 are enlarged detail views of the split ring, illustrating modified constructions. Figs. 12 and 13 are views similar to Figs. 5 to 8, illustrating a modified construction of the split ring and wedge or lever.

Similar characters of reference denote corresponding parts in the several views.

In the said drawings the reference-numeral 1 denotes the driving member of the clutch, the same being mounted to freely rotate on the shaft 2 and being provided with the usual driving-pulley 3 for receiving the driving-belt. (Not shown.) At one end the clutch member 1 is enlarged and internally recessed at 4 to receive loosely thereon the split ring 5. Said split ring is preferably formed in two parts, as shown in Fig. 3, a pin 6 being loosely interposed between the ends thereof opposite the actuating wedge or lever hereinafter described.

Keyed to the shaft 2 at 7 is the driven member 8 of the clutch, the same being recessed at 9 to loosely receive therein a wedge or lever 10, having one end lying in and snugly fitting between the ends of the split ring 5 and having its opposite tapered end extending parallel with the shaft 2 and lying in said recess 9, as shown. A short pin 11, fixed to said wedge or lever 10, abuts against the end of member 8 to prevent longitudinal movement of said wedge or lever. Mounted on said loose member 8 and movable longitudinally thereon is a sleeve 12, the same being adapted to slide over the enlarged end of the fast member 1. Said sleeve is grooved annularly at 13 to receive the shifting lever (not shown) of any well-known construction and is provided with two pins 14, fixed therein and projecting into the recess 9 of driven member 8 on each side of the tapered end of wedge or lever 10.

From the above description the operation of my improved construction will be understood to be as follows: Power being applied to the driving member 1 through the driving-pulley 3 by means of the usual belt to rotate the same and the parts being in the position shown in Figs. 1 and 2, the split ring 5, fitting snugly in the recess 4 of driving member 1, will be carried by the slight frictional contact therewith in the direction of rotation and will carry with it the wedge or lever 10 until the latter abuts against that wall of the recess 9 in driven member 8 toward which the driving member 1 is rotating. Now as this point of contact is immediately adjoining the split ring 5 the longitudinal position of said wedge or lever 10 will be unaffected thereby, and as said split ring will not be expanded the resistance offered by the driven member 8 and its connected parts will overcome the slight frictional resistance offered by the unexpanded split ring 5, and the latter will be stopped. Now when it is desired to connect the two members of the clutch to cause them to rotate in unison the sleeve 12 is shifted to the left toward the driving member 1, with the result that the pin 14, lying on the side toward which the split ring 5 and wedge or lever 10 have been moved, will contact with the tapered side of said wedge or lever and during the further movement of said sleeve 12 will gradually force said tapered end of the wedge or lever in the opposite direction, thus tilting said wedge or lever and gradually expanding the ends of the split ring 5, the point of contact between said wedge or lever and the wall of recess 9 in driven member 8 acting as a fulcrum. It will thus be seen that this tilting of the wedge or lever 10 upon the wall of recess 9 as a fulcrum will continue until the consequent expansion of split ring 5 affords a sufficient gripping action on the driving member 1 to overcome the load of the driven member 8 and its connected parts, whereupon said member 8 will rotate in unison with member 1. This result being accomplished, the further movement of sleeve 12 to the left will, through pin 14, force wedge or lever 10 away from contact with the wall of recess 9, thus shifting the fulcrum-point of said wedge or lever to said pin 14, so that any subsequent increase in the load imposed on driven member 8, will through the frictional drag of split ring 5, automatically cause a further tilting of wedge or lever 10 on the pin 14 as a fulcrum and a consequent increased expansion of said split ring, whereby the greater the load imposed on member 8 the harder the gripping action of the split ring 5.

In Figs. 5, 6, 7, and 8 I have illustrated by diagrammatic views the above-described operation as follows: In Fig. 5 the parts are shown with the pin 14 moved to the right, so that the split ring 5 is unexpanded, the point of contact between wedge or lever 10 and the wall of recess 9 being shown at $x$. In Fig. 6 the pin 14 has been moved to the left by its sleeve 12 until it just contacts with, but does not yet turn, the wedge or lever 10. In Fig. 7 the pin 14 has been moved still further to the left until it has turned wedge or lever 10 on the point $x$ as a pivot just far enough to expand split ring 5 sufficiently to overcome the resistance of the load imposed on driven member 8, thereby causing the parts to rotate in unison. In Fig. 8 the pin 14 has reached its extreme limit of movement to the left, thereby carrying the wedge or lever 10 away from the point $x$ and itself forming the pivotal point of said wedge or lever, so that any increase in the load imposed on the clutch will, through the drag of split ring 5, automatically cause a further tilting of wedge or lever 10 on pin 14 as a pivot and a consequent increased expansion of said split ring, which will necessarily increase the gripping action of said split ring. It will thus be seen that when in the position shown in Fig. 7 the wedge or lever 10 is a lever of the first order, the fulcrum being at $x$, the power at the pin 14, and the load at the split ring 5; but when the pin 14 is further shifted to the left the wedge or lever 10 at once becomes a lever of the third order, the fulcrum being at the pin 14, the power at the point $y$ in Fig. 8, and the load at the point $z$.

By employing the above-described construction it has been found in practice that the clutch may be applied in a most gradual manner and without the slightest jerking action, so detrimental with many kinds of machinery, particularly where gearing is employed.

While I have shown and described two pins 14, one on each side of the tapered end of wedge or lever 10, it will be understood that but one of the same is operative with a fixed direction of rotation of the driving member 1, the other pin 14 coming into operation only when the direction of rotation is reversed.

An important advantage obtained by the location of the body of the lever 10 outside of the plane of the diameter of the split ring 5 is that the size of the clutch may be reduced to a minimum, it only being necessary to provide room for the split ring 5.

In Fig. 9 I have illustrated a modified construction of the split ring, the same being indicated at $5^a$, and being surrounded by a metallic band 15, having its split ends inturned at 16 and engaged in a recess 17, formed in said split ring, preferably on the side opposite to that where the wedge or lever 10 engages therewith. Said band 15 forms the frictional bearing-surface against the driving member 1 of the clutch, and when the direction of rotation of said member 1 is in the direction of the arrow said band will be shifted to the position shown, so that the right-hand inturned end 16 thereof will engage that wall of recess 17 in the split ring to pull said split ring around. It will be understood that when the direction of rotation of member 1 is reversed the band 15 will be carried in the opposite direction, thus bringing the left-hand inturned end 16 in engagement with its wall of recess 17, thereby exerting a similar pull in that direction. The advantage of this construction is that the member 1 exerts a pulling action on split ring $5^a$, as distinguished from the pushing action exerted when said band is dispensed with, thereby rendering the clutching action smoother and less liable to a jerking action.

I have illustrated in Figs. 10 and 11 further modified forms of the spilt ring. In Fig. 10 the split ring is indicated at $5^b$ and is formed in two sections, the meeting faces 18 of the same opposite the point of engagement of the wedge or lever 10 being inclined slightly away from each other toward the center of the split ring. Located between said faces 18 is a wedge 19, against which impinges one end of a spring 20, the enlarged portions of the split ring forming part of the faces, 18 being slotted at 21 to receive the end of said spring when the latter forces the wedge 19 outward. By means of this construction any wear on the split ring $5^b$ is automatically taken up, the wedge 19 being forced outward by the spring 20, thus further separating the two parts of said split ring. Said spring may be a very light one, as it is obvious that by reason of the slight relative angle of separation of the faces 18 pressure on the wedge 19 by the split ring will not force said wedge back against even a light pressure due to the frictional resistance between the faces 18 and wedge 19. In Fig. 11 the construction and operation are the same as in Fig. 10, except that the split ring $5^c$ is divided into three parts, and two wedges $19^a$ are employed, which are pressed outwardly by the single spring $20^a$.

It will be obvious that the construction shown in Fig. 9 and the constructions shown in Figs. 10 and 11 are in no sense alternative, as the band 15 may be applied to either the Fig. 10 or the Fig. 11 construction without interfering in any way with the action of the wedges 19 or $19^a$.

In Figs. 12 and 13 I have illustrated a modified form of construction of the wedge or lever, the same being shown at $10^a$ and having its sides contacting with the ends of the split ring $5^d$, formed in the arc of a circle whose diameter would be considerably greater than the width of said wedge or lever at that point. I also recess the split ring $5^d$ on one side at 22 and correspondingly project the member $8^a$ at 23 to engage therein, said projection, however, being somewhat shorter than the length of recess 22, as shown. In this construction with the parts shown as in Fig. 12, which corresponds to that shown in Fig. 6, the wedge will remain untilted and one wall of recess 22 will be carried into contact with the projection 23, which performs the function of the point $x$ in Figs. 6 and 7. In Fig. 13 the pin $14^a$ is shown moved to the left to the position corresponding to Fig. 8—that is to say, past the point where the wedge or lever $10^a$ has been tilted sufficiently to expand the split ring into clutching action. In this position, because of the width of said pin $14^a$, the wedge or lever $10^a$ will be shifted bodily from the adjacent wall of the recess $9^a$ of the member $8^a$, the split ring $5^d$ being also bodily shifted a corresponding distance, so that the wall of recess 22 will be moved away from contact with projection 23, as shown, the result being, as in Figs. 5 to 8, that any increase in the load imposed on the clutch will, through the frictional drag of split ring $5^d$, automatically cause a further tilting of wedge or lever $10^a$ on the pin $14^a$ as a fulcrum, and a consequent increased expansion of said split ring, as hereinbefore described with respect to Figs. 5 to 8. One advantage of this construction is that while on the one hand in the construction shown in Figs. 5 to 8 the points of application of the lever 10 are fixed at $y\ z$, on the other hand in Figs. 12 and 13 the initial points of application are at $a\ a$, which points gradually shift to $b\ b$ in Fig. 13, thus approaching the pin 14, the result being that the leverage of lever 10 is greater in Fig. 13 than in Figs. 7 and 8 by reason of the fact that the distance between point $b$ and pin 14 is always greater than that between point $y$ and pin 14. Thus, too, in the modified construction with a light load the leverage is greater than with a heavy load, for under the latter condition the point $b$ must be brought nearer to the pin 14 to sufficiently expand the split ring, which necessarily shortens the distance between point $b$ and pin 14. Another advantage of this construction is that as the points of contact between the wedge or lever $10^a$ and the ends of split ring $5^d$ are gradually shifted from the points $a$ in Fig. 12 as the pin $14^a$ is moved to the left to the points $b$ in Fig. 13, instead of from the whole flat sides of wedge or lever $10^a$ abruptly to the points $y$ and $z$ in Fig. 8, the application of the clutch will be more gradual, thus effecting the clutching of the members with greater ease and with practically perfect smoothness.

Having thus described my invention, what I claim as new, and desire to secure by Letters Patent, is—

1. In a friction-clutch, the combination with the two members thereof, and a gripping member loosely disposed in operative relation thereto, of means independent of said clutch members for forcing said gripping member into gripping action, and means for causing said gripping member to automatically increase the gripping action in proportion to any increase in the load.

2. In a friction-clutch, the combination with the two members thereof, and an expansible member loosely disposed in operative relation thereto, of means lying outside of the plane of the diameter of said expansible member for forcing said expansible member into gripping action against the load on the clutch, and for causing said expansible member to automatically increase the gripping action in proportion to any increase in said load.

3. In a friction-clutch, the combination with the two members thereof, and an expansible member loosely disposed in operative relation thereto, of a wedge or lever for expanding said expansible member into gripping action, and a movable part independent of said clutch members adapted to initially tilt said wedge or lever to expand said expansible member against the load on the clutch, and to further tilt said wedge or lever automatically through the expansible member as the load on the clutch is increased.

4. In a friction-clutch, the combination with the two members thereof, and an expansible member loosely disposed in operative relation thereto, of a wedge or lever for expanding said expansible member into gripping action, and means for operating said wedge or lever to shift the fulcrum-point of said wedge or lever and the point of application of the power and to change the character of the power, so that the expansible member is initially expanded against the load of one of the members, but is further automatically expanded by any increase in the load imposed on the clutch.

5. In a friction-clutch, the combination with the two members thereof, and a split ring loosely disposed in operative relation thereto, of a wedge or lever engaging between the ends of said split ring for expanding the latter into gripping action, and a movable part independent of said clutch members engaging the free end of said wedge or lever to tilt the same and thus expand said split ring against the load and by its further movement after the split ring has been expanded sufficiently to clutch the members becoming the fulcrum of said wedge or lever, whereby any increase in the load imposed on the clutch will cause said split ring to automatically increase the tilt of said wedge or lever and thereby further expand said split ring into firmer gripping action.

6. In a friction-clutch, the combination with the two members thereof, and a split ring loosely disposed in operative relation thereto, of a wedge or lever engaging between the ends of said split ring for expanding the latter into gripping action and having its free end tapered, a sleeve shiftable on one of said members toward and from the other member, and a projection carried by said sleeve for engaging, when shifted, the tapered end of said wedge or lever to tilt the latter and thus expand said split ring into gripping action against the load imposed on the clutch, and in its further movement becoming the fulcrum of said wedge or lever whereby any increase in the load will cause said split ring to automatically increase the tilt of said wedge or lever and thereby further expand said split ring into firmer gripping action.

7. In a friction-clutch, the combination with the two members thereof, and a split ring loosely disposed in operative relation thereto, of a wedge or lever having one end engaging between the ends of said split ring for expanding the latter into gripping action and having its other end tapered and freely disposed in one of said members, a wall in said member immediately adjacent to said split ring forming the initial fulcrum-point for said wedge or lever, a sleeve shiftable on said member toward and from the other member, and a projection carried by said sleeve for engaging, when shifted, between the fulcrum-wall and the tapered end of said wedge or lever to tilt the latter and thus expand said split ring into gripping action against the load imposed on the clutch, and for forcing, in its further movement, said wedge or lever away from said wall and thus becoming the fulcrum of said wedge or lever whereby any increase in the load will cause said split ring to automatically increase the tilt of said wedge or lever and thereby further expand said split ring into firmer gripping action.

8. In a friction-clutch, the combination with the two members thereof, of an expansible member loosely disposed in operative relation thereto, a wedge or lever for expanding said expansible member into gripping action, means for gradually shifting the points of contact between the two as the gripping action is applied to shorten the leverage, and means for operating said wedge or lever.

9. In a friction-clutch, the combination with the two members thereof, and an expansible member loosely disposed in operative relation thereto, of a wedge or lever for expanding said expansible member into gripping action, the points of contact between said expansible member and said wedge or lever being formed on a curve and means for operating said wedge or lever.

10. In a friction-clutch, the combination with the two members thereof, and an expansible member loosely disposed in operative relation thereto, of a wedge or lever for expanding said expansible member into gripping action and having its contacting surfaces with said expansible member formed on a curve and means for operating said wedge or lever.

11. In a friction-clutch, the combination with the two members thereof, a split ring loosely disposed in operative relation thereto, and means for operating said split ring of a split band encircling said split ring and forming an intermediate surface between said split ring and its gripping surface, said band having its ends inturned and adapted to engage said split ring whereby the movement imparted to said band when forced by the expansion of said split ring into gripping action will be imparted to said split ring.

12. In a friction-clutch, the combination with the two members thereof, of a split ring disposed in operative relation thereto, means for automatically and permanently expanding said split ring to compensate for wear thereon, and independent means for expanding said split ring into gripping action.

13. In a friction-clutch, the combination with the two members thereof, of a split ring disposed in operative relation thereto and formed in a plurality of sections, means for automatically and permanently separating the sections of said split ring to compensate for wear thereon, and independent means for expanding said split ring into gripping action.

14. In a friction-clutch, the combination with the two members thereof, of a split ring disposed in operative relation thereto and formed in sections, a wedge disposed between each of said sections to automatically and permanently separate said sections to compensate for wear thereon, and independent means for expanding said split ring into gripping action.

15. In a friction-clutch, the combination with the two members thereof, of a split ring disposed in operative relation thereto and formed in sections of which meeting faces are formed at an angle to each other, a wedge disposed between each of said sections and contacting with said meeting faces, means for exerting a constant pressure on said wedge to force the same to automatically separate said sections to compensate for wear thereon, and independent means for expanding said split ring into gripping action.

16. In a friction-clutch, the combination with the two members thereof, of a split ring disposed in operative relation thereto and formed in sections of which certain meeting faces are formed at an angle to each other, a wedge disposed between each of said sections and contacting with said meeting faces, a spring for exerting a constant pressure on said wedge to force the same to automatically separate said sections to compensate for wear thereon, and independent means for expanding said split ring into gripping action.

In testimony whereof I have hereunto set my hand in the presence of two subscribing witnesses.

EDWIN EADS ANDREWS.

Witnesses:
DAYTON A. DOYLE,
ANNA E. BOYLAN.